US006535789B2

(12) United States Patent
Rautert et al.

(10) Patent No.: US 6,535,789 B2
(45) Date of Patent: Mar. 18, 2003

(54) METHOD AND DEVICE FOR PREVENTING LIMIT VALUES FROM BEING EXCEEDED IN SHEET-FED PRINTING MACHINES

(75) Inventors: Jürgen Rautert, Heidelberg (DE); Markus Gerstenberger, Heidelberg (DE); Burkhard Maass, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 89 days.

(21) Appl. No.: 09/824,380

(22) Filed: Apr. 2, 2001

(65) Prior Publication Data

US 2002/0140163 A1 Oct. 3, 2002

(30) Foreign Application Priority Data

Mar. 31, 2000 (DE) ........................................ 100 16 107

(51) Int. Cl.$^{7}$ .............................. G06F 7/00; B65H 7/02

(52) U.S. Cl. ................................... 700/213; 271/258.04

(58) Field of Search ................................ 700/213, 228, 700/230; 271/258.04, 259, 265.01, 265.03

(56) References Cited

U.S. PATENT DOCUMENTS

| | | | | |
|---|---|---|---|---|
| 5,313,253 A | * | 5/1994 | Martin et al. | 700/213 |
| 5,395,106 A | * | 3/1995 | Tohnai et al. | 271/258.04 |
| 5,528,347 A | * | 6/1996 | Kamath et al. | 399/18 |
| 5,667,215 A | * | 9/1997 | Yoshino | 271/258.04 |
| 6,042,111 A | * | 3/2000 | Rivers et al. | 700/213 |

FOREIGN PATENT DOCUMENTS

| | | |
|---|---|---|
| DE | 40 05 558 A1 | 9/1991 |
| DE | 41 03 574 A1 | 8/1992 |
| DE | 195 16 330 A1 | 11/1996 |
| GB | 2 175 116 A | 11/1986 |

OTHER PUBLICATIONS

"Sheet Alignments at the Front Lays", Technical Specification HDM M2.1449321, *Heidelberger Druckmaschinen AG,* as cited on p. 1 of the specification.

* cited by examiner

*Primary Examiner*—Christopher P. Ellis
*Assistant Examiner*—Gene O. Crawford
(74) *Attorney, Agent, or Firm*—Laurence A. Greenberg; Werner H. Stemer; Gregory L. Mayback

(57) ABSTRACT

A method for preventing limit values from being exceeded in sheet-fed printing machines includes acquiring values relevant to the printing process with respect to individual sheets, and processing those values so that predetermined limit values are maintained, detecting the development trend of a relevant value in the course of a series of sheets, and initiating measures when a change in the values occurs that would lead to a limit value being exceeded in an additional predetermined number of sheets if a continuation of the trend occurs; and a device for performing the method.

20 Claims, 1 Drawing Sheet

METHOD AND DEVICE FOR PREVENTING LIMIT VALUES FROM BEING EXCEEDED IN SHEET-FED PRINTING MACHINES

BACKGROUND OF THE INVENTION

Field of the Invention

The invention relates to a method for preventing limit values from being exceeded in sheet-fed printing machines, wherein values relevant to the printing process are acquired with respect to individual sheets and are processed to the effect of maintaining predetermined limit values. The invention also relates to a device for performing this method, which has at least one sensor for acquiring the values with respect to the individual sheets.

In sheet-fed printing machines, a series of values for the individual sheets must be maintained in order to guide the sheet precisely through the printing machine and to maintain a uniform print. In this regard, it is necessary to maintain limit values so as to avoid spoilage or a stoppage of the machine.

The technical specification of Heidelberger Druckmaschinen AG "HDM M2.1449321" teaches how to acquire relevant values of the sheets such as the sheet arrival, the inclined position or slant of sheets or the sheet alignment at the feeder, and to interrupt the supply of additional sheets or stop the entire printing machine when limit values are exceeded. A display then indicates the error that prompted the interruption in the printing. The disadvantage of this manner of preventing limit values from being exceeded is that the printing must be interrupted, and valuable operating time is lost.

SUMMARY OF THE INVENTION

It is accordingly an object of the invention to make available a method and a device as described hereinabove by which spoiled prints or an interruption of the printing when values are not maintained are optimally avoided.

With the foregoing and other objects in view, there is provided, in accordance with one aspect of the invention, a method for preventing limit values from being exceeded in sheet-fed printing machines, which comprises acquiring values relevant to the printing process with respect to individual sheets, and processing those values so that predetermined limit values are maintained, detecting the development trend of a relevant value in the course of a series of sheets, and initiating measures when a change in the values occurs that would lead to a limit value being exceeded in an additional predetermined number of sheets if a continuation of the trend occurs.

In accordance with another mode, the method of the invention includes, in determining the trend, eliminating individual values deviating from the trend.

In accordance with a further mode, the method of the invention includes providing the relevant values related to the position of the sheets at a particular angle of the printing machine.

In accordance with a first alternative mode, the method includes providing the relative values related to the position of the leading edges of the sheets.

In accordance with a second alternative mode, the method includes providing the relevant values related to a lateral shift of the sheets.

In accordance with a third alternative mode, the method includes providing the relevant values related to pull errors with respect to the alignment of sheets at a side lay.

In accordance with a fourth alternative mode, the method includes providing the relevant values related to a slant or inclined position of the sheets.

In accordance with an added mode, the method includes performing the method at the feeder of the sheet-fed printing machine.

In accordance with an additional mode, the method includes displaying the relevant values.

In accordance with yet another mode, the method includes recommending possible countermeasures to an operator.

In accordance with yet a further mode, the method includes actuating controls for the purpose of correcting the relevant values.

In accordance with another aspect of the invention, there is provided a device for performing a method of preventing limit values from being exceeded in a sheet-fed printing machine, comprising at least one sensor for acquiring relevant values with respect to individual sheets, and an evaluation device for displaying a development trend of the acquired values for initiating countermeasures.

In accordance with another feature of the invention, the device includes at least one display whereon there are displayable values of a predetermined number of sheets of a series that were the last to pass the at least one sensor, said values being continuously incremented by a value of a then current sheet and being displayed as a series of individual values in a relation thereof to a desired or nominal value and to limit values.

In accordance with a further feature of the invention, the values of the respective sheets are displayable as bars in the one display, the bars having ends representing positions of the respective values relative to the desired or nominal value and to the limit values, the limit values being represented by lines.

In accordance with an added feature of the invention, the values of the respective sheets are displayed as a curve in the display, the curve representing a development in time of the respective values in relation to the desired or nominal value and the limit values.

In accordance with an additional feature of the invention, the device includes a signaling device activatable by the evaluation device when a change occurs in the values that would lead to a crossing of a limit value in a predetermined number of sheets if a continuation of the trend should occur.

In accordance with yet another feature of the invention, the device includes an additional display actuatable by the evaluation device for displaying stored countermeasures in a readable manner if such a change of the values should occur that a limit would be crossed in a predetermined number of subsequent sheets upon a continuation of the trend.

In accordance with yet a further feature of the invention, the display is included in a plurality of displays disposed at a console of the printing machine for displaying a plurality of types of acquired values.

In accordance with yet an added feature of the invention, the values are represented by signals, and upon the occurrence of such changes of the signals representing the values that a limit would be crossed in a predetermined number of sheets if a continuation of the trend should occur, a control serves to activate at least one actuator for modifying the trend.

In accordance with a concomitant feature of the invention, the at least one sensor is disposed at the sheet feeder, and the evaluating device serves for ensuring sheet alignment by maintaining the predetermined limit values.

Thus, the object of the invention is achieved by a method which is calls for a detection of the development trend of a relevant value in the course of a series of sheets, and an initiating of measures when a change in the values occurs that would lead to a limit value being exceeded in a predetermined number of sheets, assuming a continuation of the trend. A device which serves to perform the method has an evaluating device that represents the development trend of the acquired values for initiating countermeasures.

What is achieved by the invention is that the countermeasures can be taken the instant of time that values indicate a developing tendency moving towards the limit value. This usually prevents a crossing of the limit value, because countermeasures against this development trend can be taken promptly. Consequently, there is neither spoilage nor a stoppage of the printing machine. The productivity and thus the economic efficiency of the printing machine is thereby increased.

The invention can be realized in different ways. One possibility is for the operator to be informed of the trend of the values in a timely fashion before the limit value is reached, in order to initiate countermeasures. To this end, appropriate display capabilities are proposed. Another possibility is to counteract such a trend automatically by a control. This is particularly appropriate for high-speed printing machines, because the countermeasures must be initiated relatively quickly.

A development of the method provides that individual values which deviate from the trend are eliminated in the detection of the trend. There may always be individual deviant values, which have to be eliminated for the detection of the trend in order to avoid falsification of the result. Individual deviant values such as these can occur when individual sheets include a flaw with respect to the composition or dimensions thereof, for example.

The values that are prevented from crossing a limit by the method according to the invention can be various values that are related to the individual or respective sheets being processed. Thus, the values can be the position of the sheets at a particular angle of the printing machine, the position of the leading edges of the sheets, or a lateral displacement of sheets. It is also possible that the values can represent errors in the correction in the printing machine, such as pull errors relative to the alignment of sheets at a side lay. Sheet slants, registration errors or other values relating to the individual sheets may also be acquired.

A particularly important application is the acquisition of values at the feeder of the sheet-fed printing machine, because the exact alignment of sheets is a precondition for an errorless or trouble-free run of the printing machine.

The acquired values can be displayed so that an operator can take countermeasures in time. It is possible to recommend such countermeasures to the operator, or a control for correcting the values can be actuated. The values can be represented by the device optically or acoustically in order to prompt an operator to take countermeasures, or it is possible for an evaluating device to represent the acquired values by signals which are transmitted to a control for automatically implementing the countermeasures.

An expedient embodiment of the device provides that the representation occur on at least one display, whereby the values of a predetermined number of sheets of a series that were the last to pass through the at least one sensor are continuously increased by the value of the then current sheet and displayed as a sequence of individual values in the relation thereof to the desired or nominal value and to the limit values. An operator can see the development trend in one glance on such a display, and is able to take prompt countermeasures to prevent the limit values from being exceeded. One mode of display provides for the values of the individual sheets to be represented as bars in the display, with the ends of the bars indicating the positions of the respective value in relation to the desired or nominal value and to limit values, which are indicated by lines. This way, the values of, for example, twenty sheets can be displayed, and the operator immediately recognizes if a trend is moving towards the limit value. Deviant values are also recognizable and can be disregarded in taking countermeasures against the trend. Another mode of display provides for the values of the individual sheets to be represented in the display as a curve which represents the development in time or the time rate of change of the individual values in relation to the desired value or nominal value and the limit values. This mode of display is expedient in high-speed printing machines when a large number of individual values occur within a short time period and, consequently, it is no longer possible to display individual values. What is essential in the displays is the ability to acquire a time frame of development that allows sufficient reaction time to take the corresponding countermeasures.

To prevent the operator from overlooking a corresponding trend, provision can be made for a signaling device to be activated by the evaluating device the instant a change in the values occurs which would lead to a limit value being exceeded in a predetermined number of additional sheets, assuming a continuation of the trend. The signaling device can be an optical and/or acoustical signaling device.

So that the operator can take the proper countermeasure in a short time, provision can be made, given a change of values as described hereinabove, for an additional display to be activated by the evaluation device in order to display stored countermeasures in a readable form. The operator can thus be made aware of the source of the error, or the required modification is directly indicated to him or her.

Advantageously, several displays for displaying several types of values are disposed at the console of the printing machine. The additional display for displaying information as text or symbols can also be located there. This way, the operator can get a view of the status of the printing machine at his or her main station.

An additional level of automation is appropriate for high-speed printing machines in particular. Here, there is a provision for the acquired values to be represented by signals, whereby, given such changes of the signals representing the values as would lead to a crossing of a limit in a predetermined number of sheets, assuming a continuation of the trend, a control for at least one actuator for modifying the trend is actuated. Not only does this automatic evaluation and processing of the signals unburden the operator, but it also makes it possible to take a countermeasure in fractions of a second. In high-speed printing machines, this is often the only possibility for intercepting a trend by corresponding countermeasures before the limit is crossed.

A particularly important application of the device is at the feeder of a sheet-fed printing machine. To this end, at least one sensor is disposed at the sheet feeder, and the evaluation device serves to ensure the sheet alignment by maintaining the predetermined limit values.

Naturally, each of the cited modes of the method can have a corresponding feature in the structure of the device. It is also possible to provide a combination of an automatic control and a display for the operator for checking this control. The control can also be constructed so that different relevant data, such as the type or weight of paper or the format, can be inputted. The baseline settings, for example, with respect to the feeder phase, the vacuum pressure in the feed table, the pull force for the alignment of the sheets at the side lay, and so for the, are then automatically performed by the control using these data. In the operation, these baseline settings are corrected by detecting the values actually achieved.

Other features which are considered as characteristic for the invention are set forth in the appended claims.

Although the invention is illustrated and described herein as embodied in a method and device for preventing limit values from being exceeded in sheet-fed printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
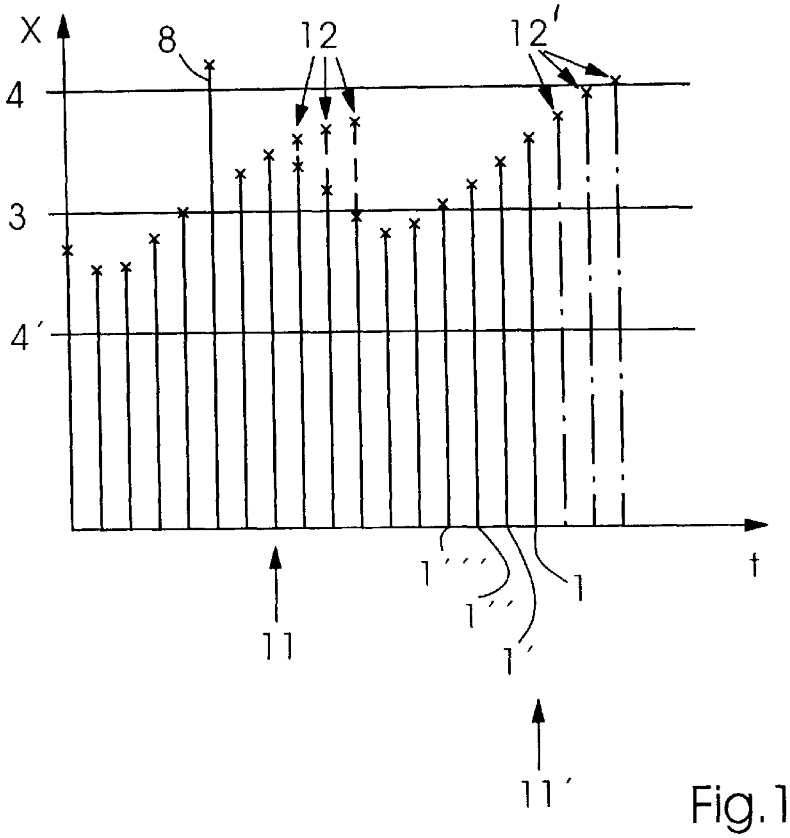
FIG. 1 is a graph-type representation of the basic concept of the invention with reference to a series of values.

FIG. 1 shows a representation of the basic idea of the invention as a plot diagram with reference to a series of values, the x-axis of the plot diagram or graph indicating the level of the values, and the individual values are lined up in chronological order along the time axis t. In regard to the example shown in FIG. 1, 3 is the desired value, 4 is the upper limit and 4' is the lower limit, 1 is the value of the last sheet, 1' that of the next to last sheet, and so forth. As a rule, the acquired values 1, 1', 1", 1'", . . . vary with a specific development trend 12. At a forecasting time 11, for example, such a trend 12 may be moving in the direction of the limit value 4. For the purpose of initiating countermeasures, a forecast is set up, wherein a given number of values are consulted in order to forecast the development in the course of the next sheets. For example, the last preceding four values can be consulted in order to forecast a development for the next three values being displayed. These next three values are identified by reference character 12'. If there is a deviant value 8 among the values that are consulted for the forecast, the deviant value 8 is not used for the forecast, because it would falsify the forecast. For a forecast time 11, no exceeding of the limit 4 results, as is apparent, and therefore no countermeasure is taken. The behavior is different at a forecast time 11', for which the limit value 4 is clearly exceeded after three additional sheets. Therefore, at the forecast time 11', a countermeasure must be taken to prevent the limit 4 from being exceeded.

Figure 2:
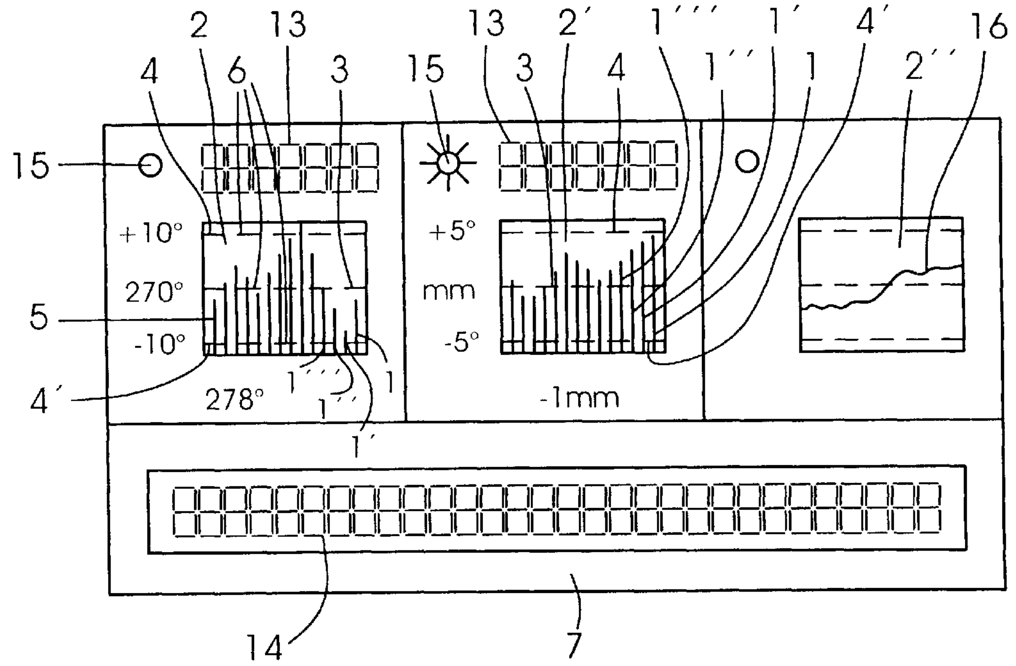
FIG. 2 a front elevational view of a display device incorporating the device according to the invention for viewing by an operator.

FIG. 2 shows a display device for viewing by an operator. Displays 2, 2', 2", . . . , which display various types of acquired values 13, serve for displaying the acquired values 1, 1', 1", 1'", . . . , of the individual sheets. Although not shown in FIG. 2, the displays 2 and 2' therein are correspondingly labeled sheet arrival and slanted sheet, respectively. Another display 7 serves for communicating readable information 14 to the operator. This information can indicate the source of the error or advise the operator as to a countermeasure.

In the exemplified embodiment represented here, the display 2 indicates the sheet arrival, with a machine angle of 180° being the desired or nominal value for the sheet arrival. Deviations of 10° are defined as the upper limit 4 and the lower limit 4'. The desired or nominal value 3, the lower limit 4' and the upper limit 4 are indicated on the display 2 by lines 6. The individual values 1, 1', 1", 1'", . . . , are indicated by bars 5, with 1 being the value of a then current sheet. These values 1, 1', 1'", 1'", . . . are continuously increased by the value of the current sheet, so that the display 2 continuously drifts from the righthand to the lefthand side with respect to the time indication and thereby displays a given number of values 1, 1', 1", 1'", . . . . It is thus possible for the operator to track the trend of the changes in the values 1, 1', 1", 1'", . . . and to initiate countermeasures when a corresponding development 12, 12' occurs. This visual forecast can be facilitated by providing a signaling device 15 which emits an optical or acoustic signal when, at a forecast time, for example, at 11', the limit value 4 will be crossed with the next sheets. In such a case, a readable countermeasure 14 can be displayed on the additional display 7; in this example, the operator is instructed to check the air pressure of the suction tape. Of course, it is also possible to couple such a display with an automatic controlling of actuators by which the machine initiates countermeasures autonomously, and the operator only checks the correct regulation of the values.

The additional display 2' indicates slanted sheets, a shift by the sheet of plus and minus 5 mm, respectively, being shown as the limit value 4, 4'. Because the values 1, 1', 1", 1'", . . . , are moving in the direction towards the limit value 4 on this display, an indication by the signaling device 15 has been triggered.

Shown as an example of an additional display 2', is that the values can also be represented by a curve 16 instead of by individual bars 5. Such a display is preferable when the displayed time span includes too many values 1, 1', 1", 1'", . . . , to be able to display them in a visually understandable manner by using a bar representation.

We claim:

1. A method for preventing limit values from being exceeded in sheet-fed printing machines, which comprises acquiring values relevant to the printing process with respect to individual sheets, and processing those values so that predetermined limit values are maintained, detecting the development trend of a relevant value in the course of a series of sheets, and initiating measures when a change in the values occurs that would lead to a limit value being exceeded in an additional predetermined number of sheets if a continuation of the trend occurs.

2. The method according to claim 1, which includes, in determining the trend, eliminating individual values deviating from the trend.

3. The method according to claim 1, which includes performing the method at the feeder of the sheet-fed printing machine.

4. The method according to claim 1, which includes actuating controls for the purpose of correcting the relevant values.

5. The method according to claim 1, which includes displaying the relevant values.

6. The method according to claim 5, which includes recommending possible countermeasures to an operator.

7. The method according to claim 1, which includes providing the relevant values related to the position of the sheets at a particular angle of the printing machine.

8. The method according to claim 7, which includes providing the relative values related to the position of the leading edges of the sheets.

9. The method according to claim 7, which includes providing the relevant values related to a slant or inclined position of the sheets.

10. The method according to claim 7, which includes providing the relevant values related to a lateral shift of the sheets.

11. The method according to claim 10, which includes providing the relevant values related to pull errors with respect to the alignment of sheets at a side lay.

12. A device for performing a method of preventing limit values from being exceeded in a sheet-fed printing machine, comprising at least one sensor for acquiring relevant values with respect to individual sheets, and an evaluation device for displaying a development trend of the acquired values for initiating countermeasures.

13. The device according to claim 12, including a signaling device activatable by said evaluation device when a change occurs in the values that would lead to a crossing of a limit value in a predetermined number of sheets if a continuation of the trend should occur.

14. The device according to claim 12, including an additional display actuatable by said evaluation device for displaying stored countermeasures in a readable manner if such a change of the values should occur that a limit would be crossed in a predetermined number of subsequent sheets upon a continuation of the trend.

15. The device according to claim 12, wherein the values are represented by signals and, upon the occurrence of such changes of the signal representing the values that a limit would be crossed in a predetermined number of sheets if a continuation of the trend should occur, a control serves for activating at least one actuator for modifying the trend.

16. The device according to claim 12, wherein said at least one sensor is disposed at the sheet feeder, and said evaluating device serves for ensuring sheet alignment by maintaining the predetermined limit values.

17. The device according to claim 12, including at least one display whereon there are displayable values of a predetermined number of sheets of a series that were the last to pass the at least one sensor, said values being continuously incremented by a value of a then current sheet and being displayed as a series of individual values in a relation thereof to a desired or nominal value and to limit values.

18. The device according to claim 17, wherein the values of the respective sheets are displayable as bars in said one display, said bars having ends representing positions of the respective values relative to the desired or nominal value and to the limit values, the limit values being represented by lines.

19. The device according to claim 17, wherein the values of the respective sheets are displayed as a curve in said display, said curve representing a development in time of the respective values in relation to the desired or nominal value and the limit values.

20. The device according to claim 17, wherein said display is included in a plurality of displays disposed at a console of the printing machine for displaying a plurality of types of acquired values.

* * * * *